Aug. 17, 1965 C. E. GINGHER Re. 25,841
CLOTHES HANGER
Original Filed March 15, 1961 2 Sheets-Sheet 1
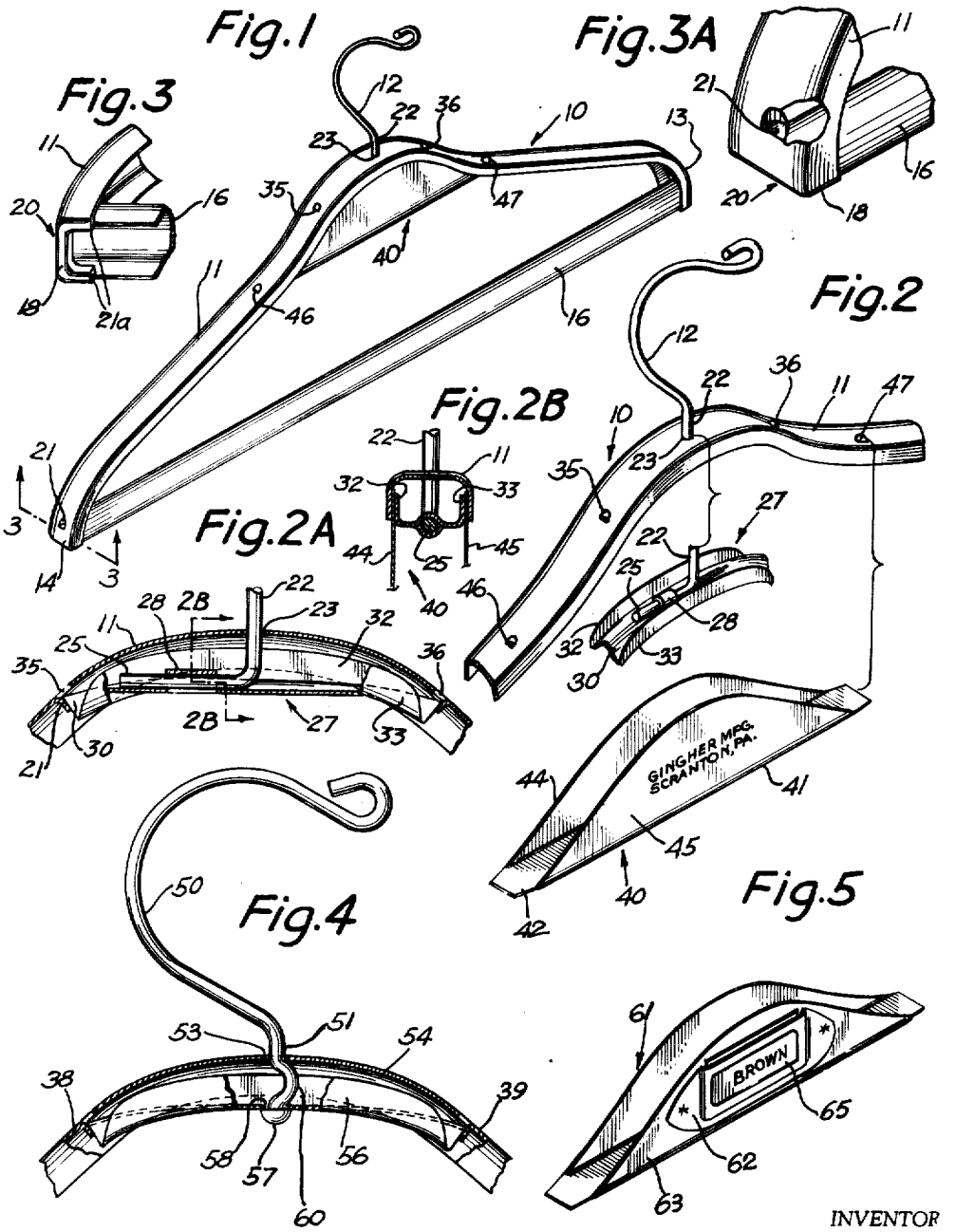
INVENTOR
CARL E. GINGHER
BY Toulmin & Toulmin
ATTORNEYS CLOTHES HANGER
Original Filed March 15, 1961 2 Sheets-Sheet 2
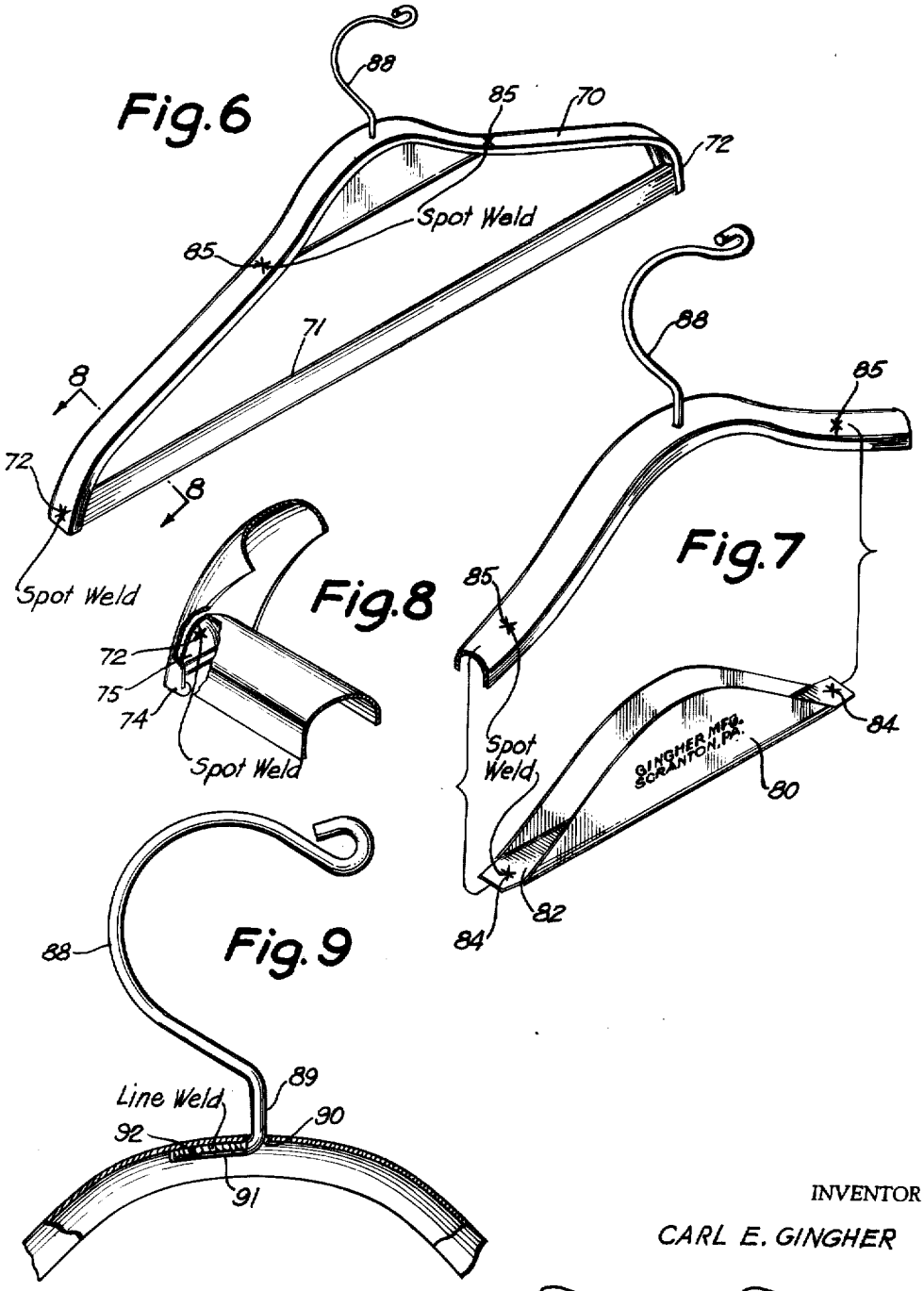
INVENTOR
CARL E. GINGHER
BY Toulmin & Toulmin
ATTORNEYS United States Patent Office Re. 25,841
Reissued Aug. 17, 1965

25,841
CLOTHES HANGER

Carl E. Gingher, 304 Depot St., Scranton, Pa.

Original No. 3,052,390, dated Sept. 4, 1962, Ser. No. 95,913, Mar. 15, 1961. Application for reissue Aug. 3, 1964, Ser. No. 399,425
11 Claims. (Cl. 223—88)

Matter enclosed in heavy brackets [ ] appears in the original patent but forms no part of this reissue specification; matter printed in italics indicates the additions made by reissue.

This invention relates generally to garment holders and more particularly to an improved clothes hanger.

In the manufacture of garment hangers, particularly wooden hangers, a large amount of the material used in making the hanger is wasted. This waste results because the components of the hanger are cut from solid pieces of wood and then shaped to conform to the shoulder outline or contour of garments to be hung thereon. Generally, a round wooden bar is attached to the lower part of the hanger to accommodate garments that can be draped thereover. The bar, however, usually is too short to support garments without some bunching and wrinkling of the garment. Attempts to overcome this objectionable feature by slotting of the hanger bar to increase the length of the bar results in weakening of the hanger so that it breaks easily.

It is an object of the present invention to provide a garment hanger of improved construction and which can be manufactured with a minimum of waste.

Another object of the invention is to provide an improved hanger which is made of suitable material, such as metal, plastic or the like, and wherein the hanger has a broad, smooth top surface for supporting the garment.

Another object of the invention is to provide a hanger having a fully extended auxiliary bar for supporting garments evenly and without causing bunching or wrinkling of the garments.

Another object of the invention is to provide a garment or clothes hanger which is adapted for receiving a name card or similar means to identify the garment placed on the hanger or to whom it belongs.

Another object of the invention is to provide a clothes hanger which is free of screws, bolts or the like fastening means, and is light in weight but strong and unyielding.

Still another object of the invention is to provide a garment hanger having a wide, rounded hanger bar surface whereby garments are evenly supported without wrinkling or creasing of the same.

The above, as well as other objects and advantages of the improved clothes hanger and its construction will be apparent from the following description taken in conjunction with the drawings illustrating the preferred embodiments thereof, and wherein—

FIGURE 1 is a view in perspective of a clothes hanger made in accordance with one embodiment of the invention;

FIGURE 2 is an exploded view in perspective of the hanger illustrated in FIGURE 1, and illustrating the construction of the several elements;

FIGURE 2A is a fragmentary view in longitudinal section taken through the shoulder bar and locking plate assembly and illustrating the construction thereof;

FIGURE 2B is a detailed sectional view of the hanger hook arrangement and taken substantially along lines 2B—2B of FIGURE 2A;

FIGURE 3 is a fragmentary view taken substantially on the line 3—3 of FIGURE 1 and looking in the direction of the arrows, and illustrating the tubular reinforced construction of the hanger;

FIGURE 3A is a similar fragmentary view in perspective and illustrating the indentation clip which secures the hanger bar to the shoulder bar;

FIGURE 4 is a view in elevation and partly in section, illustrating a modification of the hanger structure shown in FIGURE 2A;

FIGURE 5 is a view in perspective of a modified cover plate for the hanger hook attaching means and illustrating the pocket or envelope provided for receiving an identification card or the like marker;

FIGURE 6 is a similar view as in FIGURE 1 and illustrating spot welding of the hanger parts together;

FIGURE 7 is a similar view as FIGURE 2, and showing the welding locations on the shoulder bar and identification plate;

FIGURE 8 is a fragmentary detail view illustrating the manner of spot welding of the outer ends of the shoulder bar to the lower crossbar; and FIGURE 9 is a view in elevation and partly in section, illustrating how the hanger hook is welded to the shoulder bar.

Referring to the drawing more in detail, the clothes hanger 10, as illustrated in FIGURES 1 through 3A, comprises a channel member which provides a shoulder bar 11 of inverted U-shaped cross-section. The shoulder bar 11 *has an upper surface and* forms the main support for garments hung thereon. To support the hanger a hook 12 is secured to the shoulder bar 11 near its midsection. Between the *inwardly inclined* inner ends of the channel shoulder bar member 11, as at 13 and 14, a bottom hanger cross bar 16 is provided and which comprises a channel member of inverted U-shaped cross section similarly as the shoulder bar 11. This channel construction conserves material and provides a lightweight, sturdy reinforced hanger structure.

The cross bar 16 *which has an upper surface and lower edges* is held in position without welding or the use of screws or the like fastening means by crimping the parts together as best shown in FIGURES 3 and 3A. *The upper surface of the cross bar engages the inner face of the shoulder bar and the ends of the cross bar lower edges are upon the lip portions.* As illustrated, the bottom ends 18 of the shoulder bar 11 are rounded and turned inward *to form inwardly projecting lip portions* and upward. The abutting ends of the hanger cross bar 16 are turned downward *to form end wall portions which engage the inner face of the shoulder bar and* to fit snugly in a socket 20 on the lower end of the shoulder bar 11 *and the cross bar is restrained against vertical movement.* An indentation integral clip 21 on the shoulder bar, such as may be punched therefrom, holds the hanger bar in place and prevents it from coming out of the groove 21a on the inner side of the shoulder bar, as depicted in FIGURE 3A.

To support the hook 12, a shank portion 22 is provided, which extends through a central aperture 23 of the shoulder bar 11 and terminates in an angle section 25 which is fastened to an arcuate shaped locking plate 27. The angle section 25 of the wire hook is inserted through an integral loop or recess portion 28 of the locking plate 27 as shown in FIGURE 2, securing the hook and evenly distributing the load on the hanger to the underside of the shoulder bar 11. The hook shank portion 22, as illustrated in the structural arrangement in FIGURE 2A and FIGURE 2B is spaced far enough away from the recess or loop portion 28 so as to support any downwardly directed push or force on the hanger hook 12. The bottom of the hanger hook is thus supported so that it does not tend to move or slip out of place during use of the hanger. This structural arrangement secures the hook in place and prevents the same from turning about. The arrangement also provides strength and distribution of weight for any pulling force or load on the hanger.

The locking plate 27 is of U-shaped cross section to fit snugly within the channel-shaped shoulder bar 11 as illustrated in FIGURES 1 and 4. As shown, the bottom wall 30 of the locking plate is bowed upward to provide a corrugated plate structure. Integral with the bottom wall 30 are upstanding side walls or legs 32 and 33 which fit snugly and contiguous with the inner side wall surfaces of the shoulder bar 11. The hook support and locking plate 27 when fitted into the shoulder bar is secured in place by indentation clips or projections 35 and 36 similarly as at 21. The projections comprise partially punched out wall portions in the shoulder bar 11, such as illustrated at 21 in FIGURE 3A and at 38 in FIGURE 4.

Fitted over the locking plate 27 is a shouldered channel cover plate member 40 which is constructed and arranged with respect to the hanger shoulder bar as illustrated in FIGURES 2, 2A and 2B. This cover plate 40, which functions both as a handgrip section and identification member, is of U-shaped cross section and comprises a broad flat bottom wall 42 with integral upstanding parallel side walls or legs 44 and 45, the latter walls having uppermost arcuate-shaped top surfaces to fit snugly and contiguous against the underside wall portions of the locking plate 27, as illustrated in FIGURES 2 and 2B.

The handgrip and identification member 40 when fitted in place, as illustrated in FIGURE 1, provide a hanger which is easily grasped for ready hanging or movement about during use of the hanger. The bottom or underside wall 41 of the member 40 is preferably rounded or otherwise shaped to enhance the handling ease. After assembling the member 40 in place, it is retained in position by the identation clip projections 46 and 47 which are formed in the shoulder bar 11 similarly as illustrated at 21, 38 and 39.

In the modification illustrated in FIGURE 4, a swivel type hook 50 is provided. Hook 50 comprises a shank 51 which extends through an aperture 53 of the shoulder bar 54 and is secured to a locking plate 56 by integral upset head portion 57. The locking plate 56 is of similar construction as locking plate 27 but without the recess portion 28. In this modified arrangement, the shank 51 of the hook is extended through an aperture 58 of the locking plate 56 and comprises a crimped or reverse bent portion 60, thus securing the hook to the hanger shoulder bar 54 but permitting the hook to rotate or swivel about its longitudinal axis.

The upset head portion 57 spreads the load over the entire locking plate. Further, the crimped portion 60 prevents hook from being shoved downward during handling of the hanger, and while it will swivel about it still spreads the load over the same area as the fixed hook structure.

In FIGURE 5 a modified identification means is suitably mounted on the handgrip member 61. In this modification a windowed envelope 62 is secured, as by spot welding, to the wall 63 of the handgrip member 61. As shown in FIGURE 5, the windowed envelope 62 is open at the top to receive a card or identification slip such as illustrated at 65 for marking the hanger.

Further, where desired, the entire hanger assembly structure comprising all of the component parts may be united to form the complete hanger by spot welding. The parts spot welded together include the shoulder bar, lower crossbar for supporting pants, etc., and the hook, hook locking plate, handgrip and identification plate.

FIGURES 6 through 8 illustrates such a hanger structure with the parts welded together. This welding construction makes for a lower cost garment hanger and provides a simplified embodiment of the invention.

As illustrated in FIGURES 6, 7 and 8, the inverted U-shaped shoulder piece 70 is jointed to the other ends of a cross bar 71, of similar inverted U-shaped cross section by a spot weld 72. The end extremities of the shoulder piece 70, as illustrated at 74 in FIGURE 8, are turned under and back against the end wall portion 75 of the cross bar 71 whereby mechanically interlocking the shoulder piece with the cross bar. To secure the parts firmly together the same are spot welded as at 72, as aforedescribed.

The cover plate and identification member 80 is spot welded at its extremities on the base wall 82, as indicated at 84, to the underside of the shoulder piece 70.

In FIGURE 9, the garment hanger supporting hook 88 is provided with a shank portion 89 which extends through an opening 90 in the shoulder piece 70. An integral, laterally extending end portion 91, which is shaped to fit contiguous with the underside wall of the shoulder piece, is suitably welded thereto, as shown at 92. The spot welding of the hanger parts together provides a very sturdy but light weight metal assembly, and a hanger which is entirely free of bolts, nuts or screws.

The improved hanger of the invention is of simplified construction and is economical to manufacture. The corrugated structure of the hanger elements and interlocking of the same produces a rugged garment hanger which is exceptionally strong and durable yet light of weight. While the hanger is very light in weight the hanger can be comfortably carried about loaded, and the longer hanger crossbar 16 permits garments to be supported without bunching and creasing of the same.

Any desired markings can be placed on the hanger by utilizing the card insert 65 and entering on it the desired identification or marking. The hanger may be finished in any manner desired, such as by painting, plating or the like, to provide a hanger having a pleasing durable finish. Where desired, the auxiliary crossbar hanger element may be omitted.

Where all or part of the hanger is made of synthetic plastics, such as heat-curable resins, e.g. epoxy resin, urea formaldehyde resin or the like, the parts are preferably cemented together. A suitable cement or bonding agent useful for this purpose is a polyester-styrene copolymer such as described in U.S. Patent No. 2,576,392. Utilizing such resinous cements plastic parts may be bonded to metal. This permits the use of a plastic crossbar 16 with a metal shoulder bar 11. If desired, the handgrip and identification plate 40 are made of plastic and fitted in place and cemented to the shoulder bar. The member 40 not only functions as a handgrip and identification plate, but serves to reinforce and strengthen the shoulder bar.

It will be understood that the particular construction and arrangement of the hanger as described and illustrated in the drawings is not limitative of the invention since numerous changes and substitutions of parts may be made by those skilled in the art without departing from the spirit and scope of the invention, the same being more particularly set out in the appended claims.

What is claimed is:

1. A garment hanger assembly comprising a shoulder bar having an inverted U-shaped cross section for supporting a garment, a cross bar of inverted U-shaped cross section secured thereto and extending between the opposite ends of said shoulder bar, the outermost end portions of said shoulder bar comprising a socket including an inwardly projecting wall portion for receiving the outermost end portions of said cross bar and interlocking the parts together, a hanger hook connected to said shoulder bar for supporting said hanger, said hook having a shank portion extending through an aperture in said shoulder bar, a locking plate of U-shaped cross section with upstanding side wall portions which fit snugly against the inner side walls of said shoulder bar, means for securing said locking plate to said shoulder bar, said hook having an end portion fastened to said locking plate, a cover plate disposed beneath and enclosing said locking plate, and means for securing said cover plate to said shoulder bar, said cover plate being U-shaped in cross section and comprising a bottom wall with upstanding side walls which are fitted snugly and contiguously against the upstanding side wall portions of said locking plate.

2. A garment hanger assembly comprising a shoulder bar having an inverted U-shaped cross section for supporting a garment, a cross bar of inverted U-shaped cross section secured thereto and extending between the opposite ends of said shoulder bar, the outermost end portions of said shoulder bar comprising a socket including an inwardly projecting wall portion for receiving the outermost end portions of said cross bar and interlocking the parts together, means comprising integral projections on said shoulder bar and engaging said cross bar for retaining said cross bar in fixed engagement with said shoulder bar, a hanger hook connected to said shoulder bar for supporting said hanger, said hook having a shank portion extending through an aperture in said shoulder bar, a locking plate of U-shaped cross section with upstanding side wall portions which fit snugly against the inner side walls of said shoulder bar, means comprising integral projections on said shoulder bar and engaging said locking plate for securing said locking plate to said shoulder bar, said hook having an end portion fastened to said locking plate, a cover plate disposed beneath and enclosing said locking plate, and means for securing said cover plate to said shoulder bar, said cover plate being U-shaped in cross section and comprising a bottom wall with upstanding side walls which are fitted snugly and contiguously against the upstanding side wall portions of said locking plate.

3. A garment hanger assembly comprising a shoulder bar having an inverted U-shaped cross section for supporting a garment, a cross bar of inverted U-shaped cross section secured thereto and extending between the opposite ends of said shoulder bar, the outermost end portions of said shoulder bar comprising a socket including an inwardly projecting wall portion for receiving the outermost end portions of said cross bar and interlocking the parts together, means comprising a spot weld jointure for securing said cross bar to said shoulder bar, a hanger hook connected to said shoulder bar for supporting said hanger, said hook having a shank portion extending through an aperture in said shoulder bar, a locking plate of U-shaped cross section with upstanding side wall portions which fit snugly against the inner side walls of said shoulder bar, means comprising a spot weld jointure for securing said locking plate to said shoulder bar, said hook having an end portion fastened to said locking plate, a cover plate disposed beneath and enclosing said locking plate, and means comprising a spot weld jointure for securing said cover plate to said shoulder bar, said cover plate being U-shaped in cross section and comprising a bottom wall with upstanding side walls which are fitted snugly and continguously against the upstanding side wall portions of said locking plate.

4. A garment hanger assembly comprising a shoulder bar having an inverted U-shaped cross section for supporting a garment, a cross bar of inverted U-shaped cross section secured thereto and extending between the opposite ends of said shoulder bar, the outermost end portions of said shoulder bar comprising a socket including an inwardly projecting wall portion for receiving the outermost end portions of said cross bar and interlocking the parts together, a hanger hook connected to said shoulder bar for supporting said hanger, said hook having a shank portion extending through an aperture in said shoulder bar, a locking plate of U-shaped cross section with upstanding side wall portions which fit snugly against the inner side walls of said shoulder bar, said hook having an end portion fastened to said locking plate, a cover plate disposed beneath and enclosing said locking plate, said cover plate being U-shaped in cross section and comprising a bottom wall with upstanding side walls which are fitted snugly and contiguously against the upstanding side wall portions of said locking plate, said hanger hook being spot welded to the underside of said shoulder bar and said cover plate and cross bar being spot welded to said shoulder bar to provide a sturdy garment hanger.

5. A garment hanger assembly comprising a shoulder bar having an inverted U-shaped cross section for supporting a garment, a cross bar of inverted U-shaped cross section secured thereto and extending between the opposite ends of said shoulder bar, the outermost end portions of said shoulder bar comprising a socket including an inwardly projecting wall portion for receiving the outermost end portions of said cross bar and interlocking the parts together, a hanger hook connected to said shoulder bar for supporting said hanger, said hook having a shank portion extending through an aperture in said shoulder bar, a locking plate of U-shaped cross section with upstanding side wall portions which fit snugly against the inner side walls of said shoulder bar, means for securing said locking plate to said shoulder bar, said hook comprising an integral head portion for securing the shank of said hook to said locking plate, said shank having a reverse bent portion beneath said shoulder bar for securing the hook to said shoulder bar, said hook having a swivel connection with said locking plate, a cover plate disposed beneath and enclosing said locking plate, and means for securing said cover plate to said shoulder bar, said cover plate being U-shaped in cross section and comprising a bottom wall with upstanding side walls which are fitted snugly and contiguously against the upstanding side wall portions of said locking plate.

6. A garment hanger assembly comprising a shoulder bar having an inverted U-shaped cross section for supporting a garment, a cross bar of inverted U-shaped cross section secured thereto and extending between the opposite ends of said shoulder bar, the outermost end portions of said shoulder bar comprising a socket including an inwardly projecting wall portion for receiving the outermost end portions of said cross bar and interlocking the parts together, a hanger hook connected to said shoulder bar for supporting said hanger, said hook having a shank portion extending through an aperture in said shoulder bar, a locking plate of U-shaped cross section with upstanding side wall portions which fit snugly against the inner side walls of said shoulder bar, means for securing said locking plate to said shoulder bar, said hook having an end portion fastened to said locking plate, a cover plate disposed beneath and enclosing said locking plate, means for securing said cover plate to said shoulder bar, said cover plate being U-shaped in cross section and comprising a bottom wall with upstanding side walls which are fitted snugly and contiguously against the upstanding side wall portions of said locking plate, and means comprising a windowed envelope disposed on a side wall of said cover plate for receiving and removably retaining an identification marker for said hanger.

*7. A rigid clothes hanger comprising a shoulder bar having an inverted U-shaped cross section and inclined ends for supporting a garment, each end of said shoulder bar being bent to form lip portions projecting inwardly from the inner face of said shoulder bar, a hanger hook attached to said shoulder bar for supporting said hanger, a crossbar having an inverted U-shaped cross section extending between the ends of said shoulder bar with the ends of said crossbar resting upon said shoulder bar lip portions, said crossbar having end wall portions with said end wall portions positioned closely adjacent the inner face of the shoulder bar at the ends thereof.*

*8. A rigid clothes hanger comprising a shoulder bar having an inverted U-shaped cross section for supporting a garment, the ends of said shoulder bar being inclined downwardly, means at the ends of said shoulder bar for defining lip portions projecting inwardly from the inner face of the ends of said shoulder bar, a hanger hook attached to said shoulder bar for supporting said hanger, a crossbar of inverted U-shaped cross section extending between the ends of said shoulder bar, the ends of said crossbar resting upon said lip portions and engaging the*

*inner face of said shoulder bar at the inclined ends thereof whereby the crossbar is secured within the ends of said shoulder bar against movement.*

*9. A rigid clothes hanger comprising a shoulder bar having an inverted U-shaped cross section and inclined ends for supporting a garment, a hanger hook attached to said shoulder bar for supporting said hanger, a crossbar of inverted U-shaped cross section extending between the ends of said shoulder bar, the said cross bar having end wall portions with said end wall portions engaging the inner face of the shoulder bar at the ends thereof and being spot welded thereto, and means within the ends of said shoulder bar engaging the upper face and lower edges of said cross bar for restraining vertical movement of said crossbar.*

*10. A rigid clothes hanger comprising a shoulder bar having an inverted U-shaped cross section for supporting a garment, a hanger hook attached to said shoulder bar for supporting said hanger, means on the ends of said shoulder bar for defining lip portions projecting inwardly from the inner face of the ends of said shoulder bar, a cross bar of inverted U-shaped cross section extending between the ends of said shoulder bar, the ends of said cross bar resting upon said lip portions, said cross bar having end wall portions engaging the inner face of the shoulder bar at the ends thereof, and means at the ends of said shoulder bar for restraining said cross bar from movement away from said lip portions whereby the cross bar is secured within the ends of said shoulder bar against movement.*

*11. A rigid clothes hanger comprising a shoulder bar having an inverted U-shaped cross section and inclined ends for supporting a garment, each end of said shoulder bar being bent to form lip portions projecting inwardly from the inner face of the ends of said shoulder bar, a hanger hook attached to said shoulder bar for supporting said hanger, a cross bar having an inverted U-shaped cross section extending between the ends of said shoulder bar with the ends of said cross bar resting upon said shoulder bar lip portions, and means within the ends of said shoulder bar for restraining said cross bar from movement away from said lip portions whereby the cross bar is secured within the ends of said shoulder bar against movement.*

References Cited by the Examiner

The following references, cited by the Examiner, are of record in the patented file of this patent or the original patent.

UNITED STATES PATENTS

| | | | |
|---|---|---|---|
| 1,251,948 | 1/18 | Wordingham | 223—88 X |
| 1,477,973 | 12/23 | Marble | 223—88 |
| 1,615,748 | 1/27 | Fischer | 223—86 |
| 1,804,919 | 5/31 | Dockett | 223—88 |
| 1,818,193 | 8/31 | Burde | 223—88 |
| 1,828,975 | 10/31 | Magarian | 223—88 |
| 1,962,399 | 6/34 | Littledale | 223—88 |
| 2,158,465 | 5/39 | Ligon | 223—87 |
| 2,310,058 | 2/43 | Bolten et al. | 223—88 |
| 2,647,666 | 8/53 | Freidler | 223—89 |
| 2,690,863 | 10/54 | Adelman | 223—92 X |

FOREIGN PATENTS

| | | |
|---|---|---|
| 148,431 | 10/31 | Switzerland. |

JORDAN FRANKLIN, *Primary Examiner.*